(12) United States Patent
Harmon et al.

(10) Patent No.: US 11,975,688 B2
(45) Date of Patent: May 7, 2024

(54) WORK SURFACES FOR FRONT TRUNK

(71) Applicant: Ford Global Technologies, LLC, Dearborn, MI (US)

(72) Inventors: Michael John Harmon, Northville, MI (US); Hussain Z. Tajmahal, Detroit, MI (US); Benjamin Howard, Grosse Pointe Park, MI (US); Kathryn N. Cezar, Berkley, MI (US); Sarah Shaw, Commerce Township, MI (US); Charlie Qian, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/892,360

(22) Filed: Aug. 22, 2022

(65) Prior Publication Data

US 2023/0391270 A1 Dec. 7, 2023

Related U.S. Application Data (60) Provisional application No. 63/347,704, filed on Jun. 1, 2022.

(51) Int. Cl.
| | | |
|---|---|---|
| *B60R 5/02* | (2006.01) | |
| *B60R 19/52* | (2006.01) | |
| *B62D 25/08* | (2006.01) | |
| *B62D 25/10* | (2006.01) | |

(52) U.S. Cl.
CPC ............... *B60R 5/02* (2013.01); *B60R 19/52* (2013.01); *B62D 25/087* (2013.01); *B62D 25/10* (2013.01)

(58) Field of Classification Search
CPC .. B60R 5/04; B60R 5/02; B60R 5/041; B60R 19/52; B60R 13/011; B60R 13/013; B60R 2013/016; B60R 2011/0036; B62D 25/087

See application file for complete search history.

(56) References Cited

U.S. PATENT DOCUMENTS

| | | | | |
|---|---|---|---|---|
| 1,553,036 A | * | 9/1925 | Foss | A47B 3/04 108/171 |
| 1,731,920 A | * | 10/1929 | Boettger | A47B 3/02 108/153.1 |
| 4,455,948 A | | 6/1984 | Torres | |
| 4,494,465 A | | 1/1985 | Fick, Jr. | |
| 5,685,468 A | | 11/1997 | Hernandez et al. | |
| 5,730,066 A | * | 3/1998 | Auten | B60N 3/001 108/44 |

(Continued)

OTHER PUBLICATIONS

Levin, T. (Jan. 6, 2022). Tour the coolest features of the New Electric Chevy Silverado, from ultra-fast charging to a front trunk. Business Insider. Retrieved Aug. 17, 2022, from https://www.businessinsider.com/electric-chevy-silverado-ev-features-charging-midgate-frunk-multiflex-tailgate-2022-1#chevy-also-envisions-accessories-for-the-frunk-like-slide-out-drawers-and-tool-boxes-20.

(Continued)

*Primary Examiner* — Jason S Morrow
(74) *Attorney, Agent, or Firm* — Vichit Chea; Carlson, Gaskey & Olds, P.C.

(57) ABSTRACT

The techniques described herein relate to a motor vehicle, including: a front trunk; a housing adjacent a floor of the front trunk; and a panel moveable relative to the housing between a retracted position and a deployed position, wherein, when in the panel is in the deployed position, the panel provides a work surface.

16 Claims, 6 Drawing Sheets

(56) References Cited

U.S. PATENT DOCUMENTS

| | | | | |
|---|---|---|---|---|
| 6,145,447 | A * | 11/2000 | Henderson | B60R 5/04 |
| | | | | 108/115 |
| 6,176,535 | B1 | 1/2001 | Chaloult et al. | |
| D466,469 | S * | 12/2002 | Nelson, Jr. | D12/221 |
| 9,956,860 | B2 * | 5/2018 | Tsuji | B60R 5/04 |
| 10,286,816 | B2 * | 5/2019 | Murray | B62D 25/20 |
| 10,427,562 | B2 * | 10/2019 | Gibbons | B60N 2/80 |
| 10,435,082 | B1 * | 10/2019 | Kupina | B60P 1/486 |
| 10,480,239 | B1 * | 11/2019 | Wisneski | B62D 25/12 |
| 10,633,033 | B1 * | 4/2020 | Salter | B62D 25/12 |
| 10,730,441 | B2 * | 8/2020 | Glickman | B60H 1/00271 |
| 10,926,687 | B2 * | 2/2021 | Tadros | B60P 3/0255 |
| 10,926,705 | B2 * | 2/2021 | Hoffman | B60R 5/02 |
| 11,142,129 | B2 | 10/2021 | Howard, II et al. | |
| 11,345,417 | B2 * | 5/2022 | Lichter | B60J 5/103 |
| 11,400,864 | B2 * | 8/2022 | Kim | B60R 5/02 |
| 2017/0036872 | A1 * | 2/2017 | Wallace | B60R 5/041 |
| 2019/0308543 | A1 * | 10/2019 | Salewski | B65G 67/04 |
| 2021/0300249 | A1 * | 9/2021 | Nakabe | B62D 47/00 |
| 2021/0300252 | A1 * | 9/2021 | Fusco | B60R 5/041 |
| 2022/0032796 | A1 * | 2/2022 | Salter | B60L 58/18 |
| 2022/0177052 | A1 * | 6/2022 | Harmon | B60P 3/341 |
| 2022/0289312 | A1 * | 9/2022 | Aquila | B60R 5/02 |
| 2023/0278501 | A1 * | 9/2023 | Gill | B60R 5/02 |
| | | | | 296/37.5 |

OTHER PUBLICATIONS

YouTube. (Nov. 16, 2021). Ultimate Outdoors vehicle accessory; tail table! Space Innovation Labs Tail Table Review. YouTube. Retrieved Aug. 17, 2022, from https://www.youtube.com/watch?v=gLMJaiDqVMM.

* cited by examiner

WORK SURFACES FOR FRONT TRUNK

RELATED APPLICATION(S)

This application claims the benefit of U.S. Provisional Application No. 63/347,704, filed Jun. 1, 2022, the entirety of which is herein incorporated by reference.

TECHNICAL FIELD

This disclosure relates to work surfaces for a front trunk.

BACKGROUND

Electrified vehicles are being developed to either reduce or completely eliminate the reliance on internal combustion engines. With the onset of electrified vehicles, many existing components in the vehicle engine compartment may become unnecessary. The space made available by the removal of these components makes room for a front trunk, which is a storage compartment located near the front of the vehicle, and which is commonly referred to using the portmanteau "frunk."

SUMMARY

In some aspects, the techniques described herein relate to a motor vehicle, including: a front trunk; a housing adjacent a floor of the front trunk; and a panel moveable relative to the housing between a retracted position and a deployed position, wherein, when in the panel is in the deployed position, the panel provides a work surface.

In some aspects, the techniques described herein relate to a motor vehicle, wherein the housing includes a slot in a front of the housing, wherein the slot leads to an interior of the housing, and wherein, when the panel is in the deployed position, the panel projects at least partially out of the slot.

In some aspects, the techniques described herein relate to a motor vehicle, wherein, when the panel is in the deployed position, the panel projects at least partially forward of the front trunk.

In some aspects, the techniques described herein relate to a motor vehicle, further including a powered assembly configured selectively cause the panel to move between the retracted and deployed positions.

In some aspects, the techniques described herein relate to a motor vehicle, further including a closure assembly including a hood panel and a grille panel, wherein the grille panel is configured to move to an open position in which the grille panel is below the panel.

In some aspects, the techniques described herein relate to a motor vehicle, wherein the hood panel and grille panel are moveable independent of one another to respective open and closed positions.

In some aspects, the techniques described herein relate to a motor vehicle, wherein the housing is a housing of a cartridge, and wherein the cartridge is removable from the front trunk.

In some aspects, the techniques described herein relate to a motor vehicle, wherein a bottom surface of the housing directly contacts a floor of the front trunk.

In some aspects, the techniques described herein relate to a motor vehicle, wherein a top surface of the housing provides a surface for supporting items stored in the front trunk.

In some aspects, the techniques described herein relate to a motor vehicle, wherein a front surface of the panel includes a handle.

In some aspects, the techniques described herein relate to a motor vehicle, including: a front trunk; and an assembly including at least two panels moveable relative to one another between an unfolded condition and a folded condition, wherein, in the unfolded condition, the at least two panels provide a work surface.

In some aspects, the techniques described herein relate to a motor vehicle, wherein, in the unfolded condition, the at least two panels exhibit an increased an effective surface area relative to the folded condition.

In some aspects, the techniques described herein relate to a motor vehicle, wherein the at least two panels includes three panels.

In some aspects, the techniques described herein relate to a motor vehicle, wherein the at least two panels are connected to one another via hinges.

In some aspects, the techniques described herein relate to a motor vehicle, wherein the assembly is configured to attach to a rear wall of the front trunk when the assembly is in the folded condition.

In some aspects, the techniques described herein relate to a motor vehicle, wherein the rear wall includes perforated hardboard, and wherein the at least two panels are attachable to the perforated hardboard.

In some aspects, the techniques described herein relate to a motor vehicle, wherein, in the unfolded condition, the at least two panels are configured to interface with a sill of the front trunk.

In some aspects, the techniques described herein relate to a method, including: sliding a panel relative to a housing within a front trunk of a motor vehicle such that the panel moves to a deployed position in which the panel provides a work surface.

In some aspects, the techniques described herein relate to a method, further including: sliding the panel relative to the housing from the deployed position to a retracted position in which a majority of the panel is within the housing.

In some aspects, the techniques described herein relate to a method, wherein the housing is a housing of a cartridge and the method further includes: removing the cartridge from the front trunk when the panel is in the retracted position.

BRIEF DESCRIPTION OF THE DRAWINGS

In FIG. 2, the panel is in a deployed position.

In FIG. 5, the assembly is in an unfolded condition.

DETAILED DESCRIPTION

This disclosure relates to work surfaces for a front trunk. Among other benefits, which will be appreciated from the below description, the disclosed features increase the usability of the front trunk, and, in turn, the vehicle overall. In particular, many of the features discussed below are intended to make the front trunk more usable at worksites, tailgating events, etc.

Figure 1:
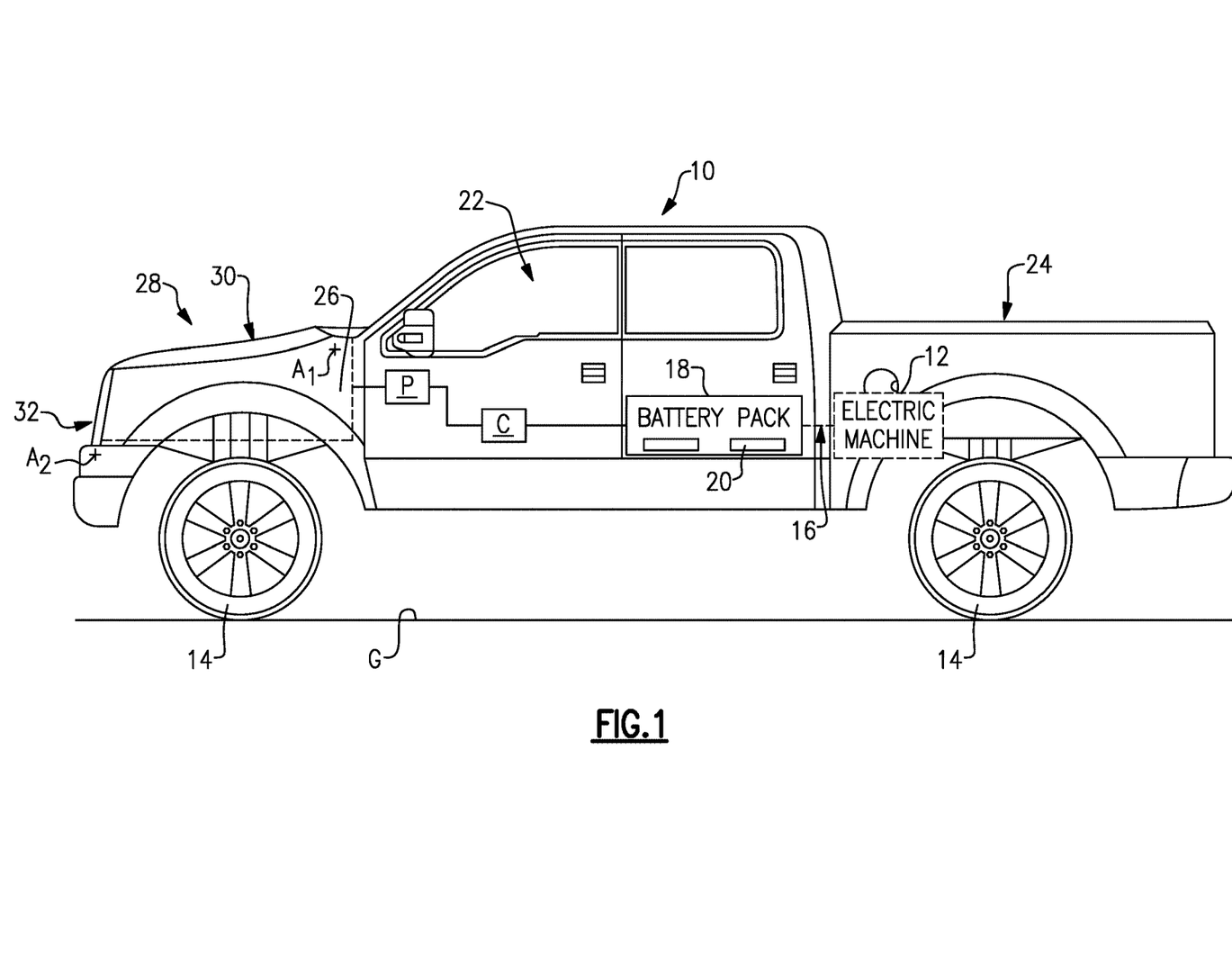
FIG. 1 schematically illustrates an electrified vehicle.

FIG. 1 schematically illustrates a motor vehicle, which here is an electrified vehicle 10 ("vehicle 10"). The vehicle 10 may include any type of electrified powertrain. In an embodiment, the vehicle 10 is a battery electric vehicle (BEV). However, the concepts described herein are not limited to BEVs and could extend to other electrified vehicles, including, but not limited to, plug-in hybrid electric vehicles (PHEVs), fuel cell vehicles, etc. Therefore, although not specifically shown in this embodiment, the vehicle 10 could be equipped with an internal combustion engine that can be employed either alone or in combination with other energy sources to propel the vehicle 10. In particular, certain aspects of this disclosure could apply to vehicles other than electrified vehicles that include front trunks, such as mid-engined or rear-engined vehicles.

In the illustrated embodiment, the vehicle 10 is a full electric vehicle propelled solely through electric power, such as by one or more electric machines 12, without any assistance from an internal combustion engine. The electric machine 12 may operate as an electric motor, an electric generator, or both. The electric machine 12 receives electrical power and provides a rotational output torque to one or more drive wheels 14, such as through a transmission gearbox (not shown).

A voltage bus 16 electrically connects the electric machine 12 to a battery pack 18. The battery pack 18 is an exemplary electrified vehicle battery. The battery pack 18 may be a high voltage traction battery pack that includes one or more battery arrays 20 (i.e., groupings of rechargeable battery cells) capable of outputting electrical power to operate the electric machine 12 and/or other electrical loads of the vehicle 10. Other types of energy storage devices and/or output devices can also be used to electrically power the vehicle 10.

In the illustrated embodiment, the vehicle 10 is a pickup truck. However, the vehicle 10 could also be a car, a van, a sport utility vehicle, or any other type of vehicle.

As shown in FIG. 1, the vehicle 10 includes a passenger cabin 22, a truck bed 24 located to the rear of the passenger cabin 22, and a front trunk 26 located to the front of the passenger cabin 22. The truck bed 24 may establish a first cargo space of the vehicle 10, and the front trunk 26 may establish a second cargo space of the vehicle 10. The front trunk 26 may be referred to using the portmanteau "frunk" or more generally as a front cargo space.

The front trunk 26 may provide an additional cargo space not traditionally available in most conventional internal combustion powered vehicles. This disclosure includes various features that increase the usefulness and usability of the front trunk 26.

The front trunk 26 is selectively covered by a closure assembly 28. In this example, the closure assembly 28 includes two independently moveable panels, namely a first panel 30 and a second panel 32, that are moveable to cover and uncover the front trunk 26. The front trunk 26, then, may be conveniently accessed through either the first panel 30, the second panel 32, or both. In the illustrated example, the first panel 30 is a hood of the vehicle 10, and the second panel 32 is a grille of the vehicle 10. The first panel 30 and the second panel 32 are each independently moveable between a closed position (FIG. 1) and an open position (FIG. 2) to selectively cover and uncover the front trunk 26, respectively. The first panel 30 may be referred to as a hood panel, and the second panel 32 may be referred to as a grille panel.

The second panel 32 may be sized and shaped to match a grille in an engine-driven model of a vehicle, such as a pickup truck, in order to maintain the same look and allow for essentially the same front end vehicle body structure across a vehicle lineup. While the second panel 32 may be configured to look the same as engine-driven vehicles, the second panel 32 exhibits solid surfaces configured to keep water out of the front trunk 26. In this example, the solid surfaces are feasible in the vehicle 10 because no air flow is needed for engine cooling.

Figure 2:
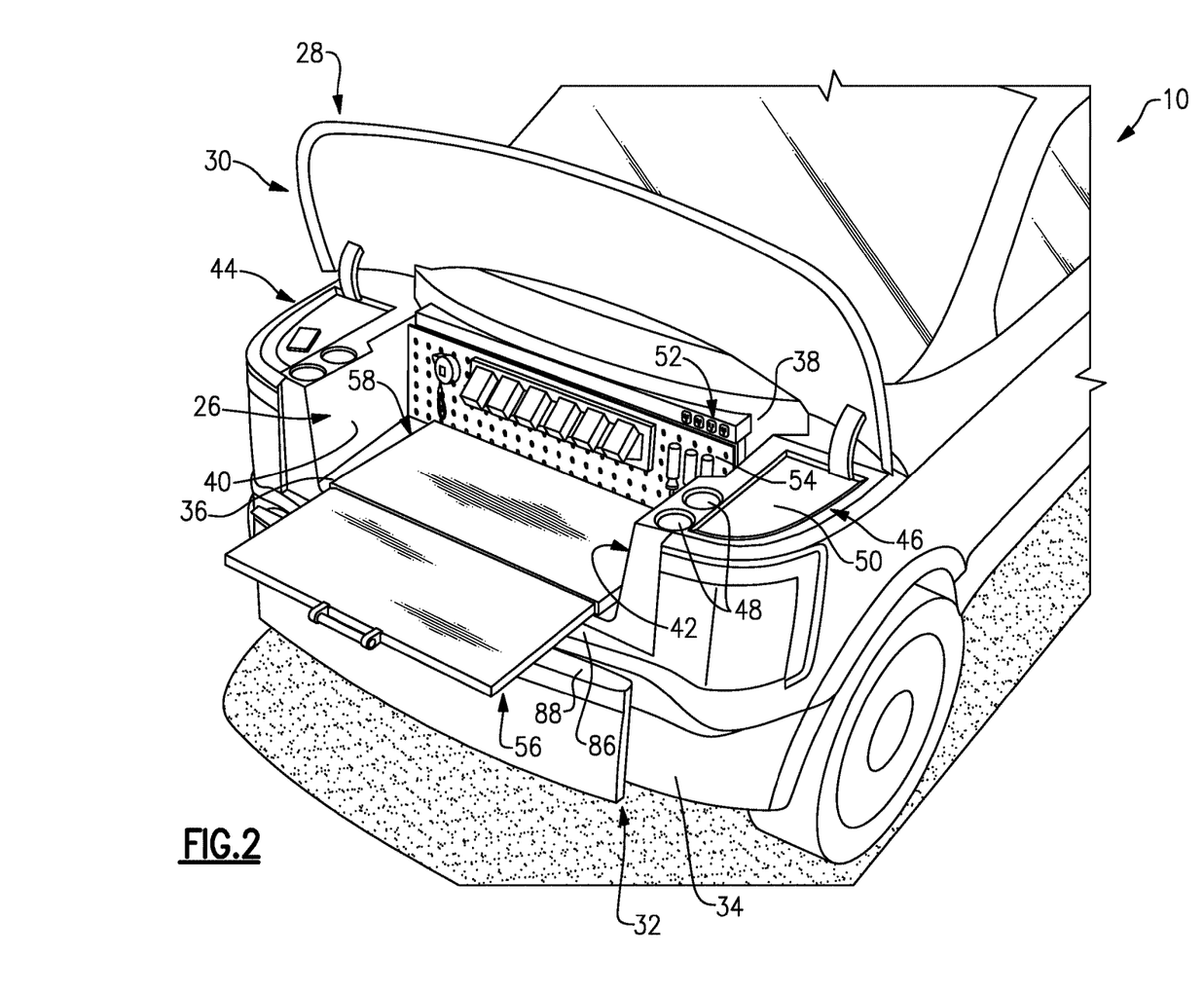
FIG. 2 illustrates a front trunk of the electrified vehicle with a first exemplary work surface, which is provided by a panel.

FIG. 2 illustrates the first and second panels 30, 32 in their respective open positions. When moving to their respective open positions, the first and second panels 30, 32 move in generally opposite directions in this example. In particular, with reference to FIG. 2, the first panel 30 has rotated rearwardly and upwardly about axis $A_1$ relative to the closed position of FIG. 1. Further, the second panel 32 has moved to an open position which is downward, generally in front of the front bumper 34, and slightly forward of the closed position. A hinge, linkage, and/or track could guide movement of the first and second panels 30, 32 between their respective open and closed positions. With both the first and second panels 30, 32 in their respective open positions, the front trunk 26 is accessible from above and from the front.

While an exemplary closure assembly is shown in FIG. 2, this disclosure extends to other arrangements of the first and second panels 30, 32. For instance, in one alternate embodiment, the second panel 32 could be configured to rotate to an open position about axis $A_2$ forwardly and downwardly relative to the closed position of FIG. 1. Axes $A_1$, $A_2$ are parallel to one another and perpendicular to a centerline of the vehicle 10 in this example. The locations of the axes $A_1$, $A_2$ are representative. Other locations for the axes $A_1$, $A_2$ come within the scope of this disclosure. In another alternate example, the closure assembly 28 includes a single panel that is configured to provide both the hood and grille sections of the closure assembly 28, and that single panel is rotatable between an open and closed position about axis $A_1$.

FIG. 2 illustrates the interior of the front trunk 26. The front trunk 26 includes a floor 36, a rear wall 38, and opposed lateral side walls 40, 42, which provide boundaries of a front cargo space of the vehicle 10. Various items can rest on the floor 36, and various other items can be attached to the rear wall 38 and the side walls 40, 42, in this example.

Laterally outward of the side walls 40, 42, side ledges 44, 46 are accessible and usable when the panel 30 is open. The side ledges 44, 46 extend laterally from an upper portion of a respective one of the side walls 40, 42 to an exterior side of the vehicle 10, and otherwise generally exhibit a similar contour to the panel 30 such that when the panel 30 is closed, the panel 30 overlaps and covers the side ledges 44, 46. In an example, the panel 30 directly abuts the side ledges 44, 46 when the panel 30 is closed. The side ledges 44, 46 are configured as useable spaces when the panel 30 is open. With reference to side ledge 46, the side ledge 46 includes two cup holders 48 and a work surface 50. The side ledge 44 is configured similarly, but reflected about the centerline of the vehicle 10. The side ledges 44, 46 are exemplary and could be configured differently. Further, the side ledges 44, 46 are not required in all examples.

The front trunk 26 may include various power outlets including 120 Volt power outlets, 240 Volt power outlets, USB-C outlets, etc. Here, the front trunk 26 includes four 120 Volt power outlets 52 in the rear wall 38. The front trunk 26 could include a desired number of power outlets in various locations.

In this example, the rear wall 38 includes perforated hardboard 54, which can be used for the storage of tools and equipment, as examples. In one example, the perforated hardboard 54 is mounted to the rear wall 38. The perforated hardboard 54 includes equally-spaced apart holes configured to receive standard sized pegs, hooks, or other adapters configured to mount and store various items. In another example, the rear wall 38 is integrally formed with equally-spaced holes corresponding to those of perforated hardboard.

The various surfaces of the front trunk 26 may be made of a polymeric material. However, other materials, including metallic materials, are also contemplated within the scope of this disclosure.

Figure 3:
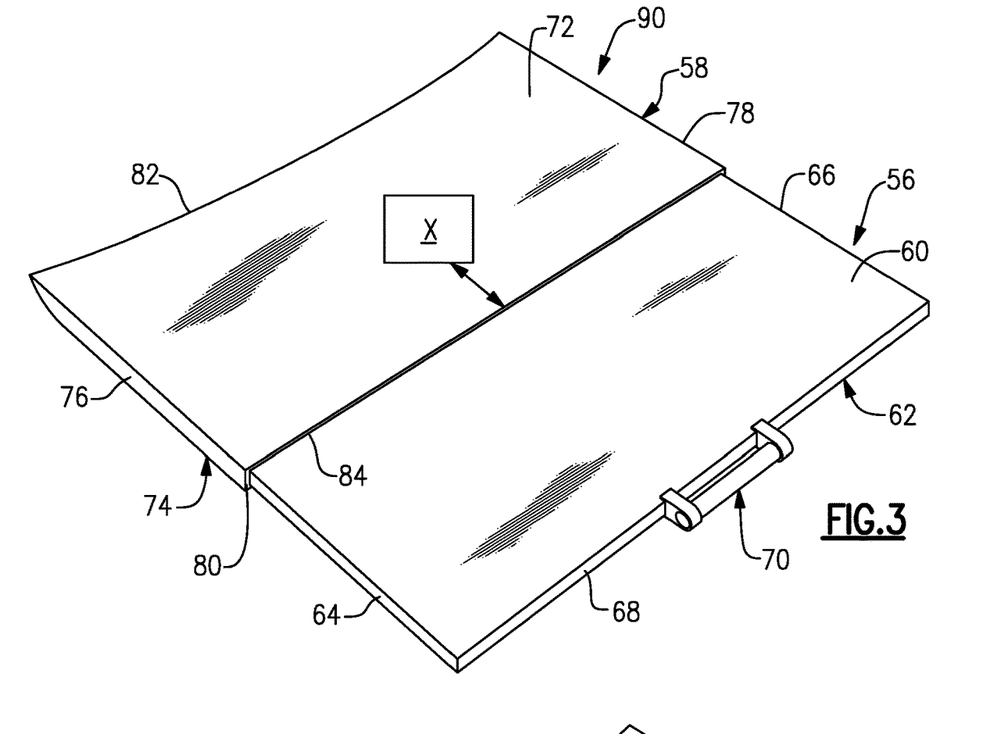
FIG. 3 is another view of the panel in the deployed position.
Figure 4:
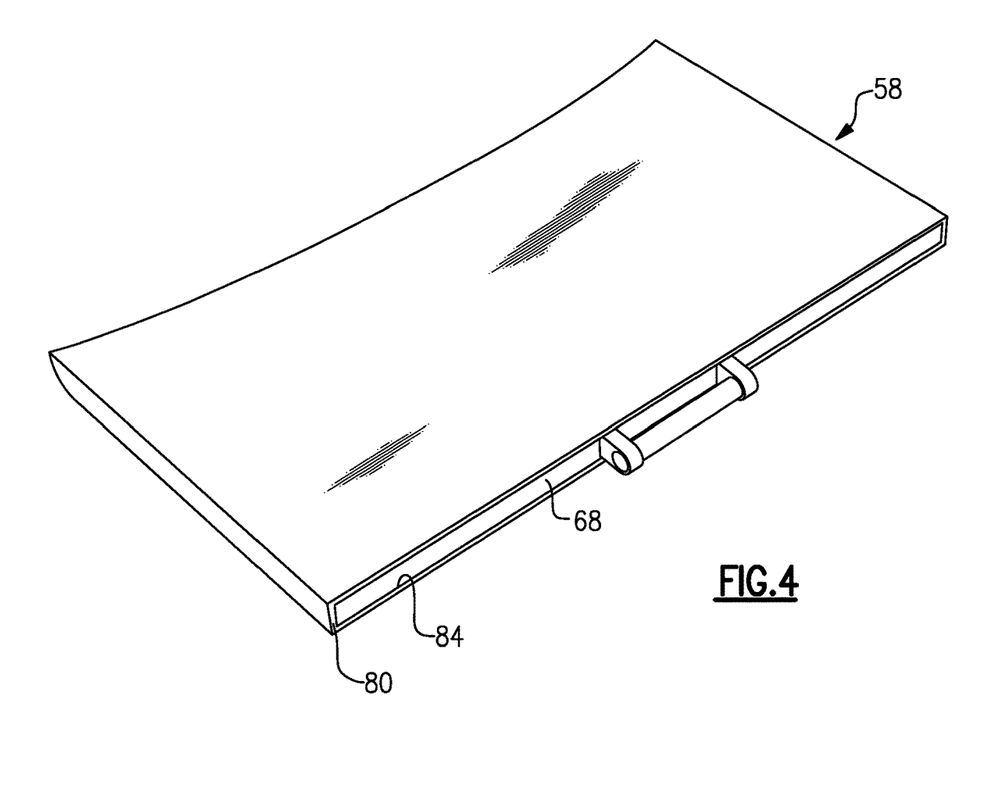
FIG. 4 illustrates the panel in a retracted position.
Figure 5:
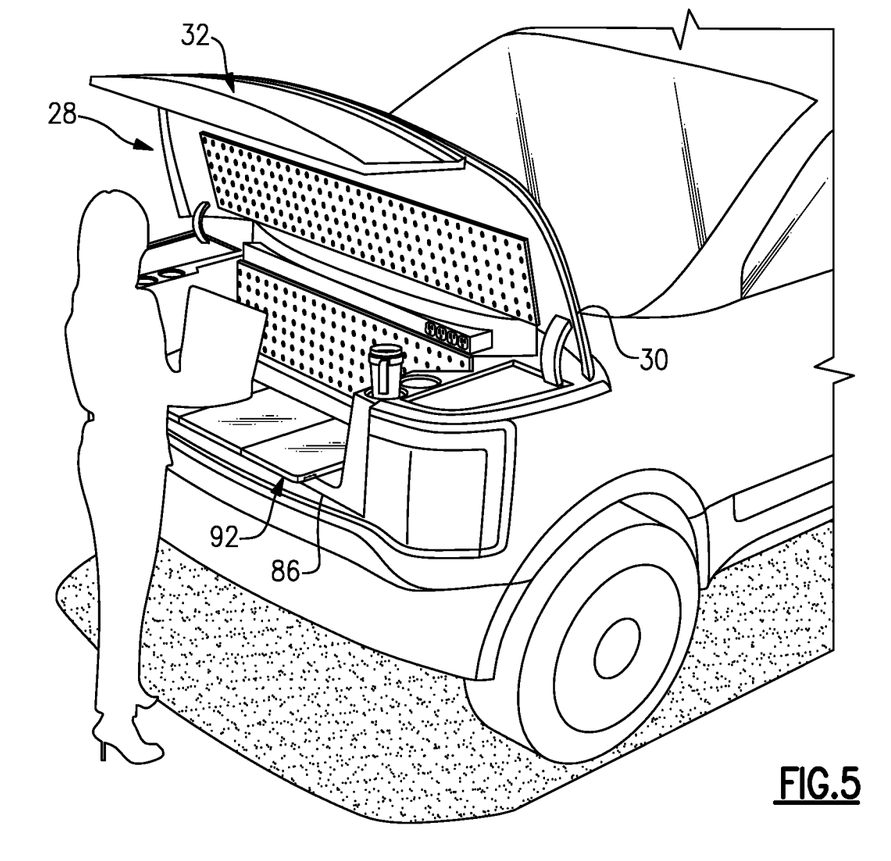
FIG. 5 illustrates a front trunk of the electrified vehicle with a second exemplary work surface, which is provided by an assembly of foldable panels.

In FIG. 2, the closure assembly 28 is in an open position. FIG. 2 also illustrates a first exemplary work surface, which is provided by a panel 56. In FIG. 2, the panel 56 is in a deployed position. In particular, with joint reference to FIGS. 2-4, the front trunk 26 includes a panel 56 configured to move relative to a housing 58 between a deployed position (FIGS. 2 and 3) and a retracted position (FIG. 4).

The panel 56 includes a top surface 60, bottom surface 62, opposed sides 64, 66, a front surface 68, and a rear surface, which is not visible in the drawings. The front surface 68 includes a handle 70 in this example. The handle 70 is configured to be grasped by a user to slide the panel 56 forward and rearward relative to the housing 58 to move the panel 56 to the deployed and retracted positions, respectively.

The housing 58 includes a top surface 72, bottom surface 74, opposed sides 76, 78, a front surface 80, and a rear surface 82. The front surface 80 includes a slot 84. The slot 84 leads to an interior of the housing 58, which is sized and shaped corresponding to the dimensions of the panel 56. The slot 84 is dimensioned such that the housing 58 can slide in and out of the interior of the housing 58. In an example, when the panel 56 is in a retracted position, a majority of the panel 56 is within the housing 58. In a particular example, when the panel 56 is in the retracted position, the front surface 68 is substantially flush with the front surface 80, with only the handle 70 projecting out of the slot 84, as shown in FIG. 4.

The panel 56 may be slidable relative to the housing 58 using one or more guides or tracks, such as tracks arranged relative to the sides 64, 66 of the panel 56.

In the deployed position, a majority of a surface area of the top surface 60 is forward of the housing 58. In this position, the panel 56 is able to support items and the top surface provides a work surface. Further, in the deployed position, a majority of the surface area of the top surface 60 is forward of the front trunk 26, and in a particular example a majority of the surface area of the top surface 60 is forward of the front bumper 34. As used herein, the term "work surface" refers to a substantially flat surface configured to act as a desk, a picnic table, and/or to facilitate performance of various tasks, including by supporting items thereon. The term work surface also refers to surfaces that can be used for storage of tools or objects being worked on by tools, provide a tabletop for writing, supporting computing devices, and/or facilitating food preparation or food service, etc.

The top surface 60 can be formed as a textured or finished surface configured to resist sliding of items places on the top surface 60. A rubber mat could be attached to or placed on the top surface 60. The top surface 60 could also include or incorporate a wireless charging pad. The top surface 60 could include one or more embossings that establish one or more measurement rulers for measuring items when positioned atop the work surface. The top surface could also include one or more power outlets.

In this example, the top surface 60 is substantially parallel to a ground surface G. The ground surface G is the surface immediately under the wheels 14 of the vehicle 10, and may be concrete, pavement, grass, dirt, etc. The ground surface G may be uneven. The term "substantially" is used herein to refer to angles that one would consider substantially close to perpendicular given the fact that the vehicle 10 may be on an uneven ground surface G.

The panel 56 is supported from below in this example by a sill 86, which is a portion of the body of the vehicle 10 extending perpendicular to a centerline of the vehicle 10 and arranged adjacent a bottom, front edge of the front trunk 26. In this example, the sill 86 is above the front bumper 34. The sill 86 directly contacts the bottom surface 62 when the panel 56 is in the deployed position, in this example.

The panel 56 is also supported from below by a top edge 88 of the second panel 32. The top edge 88 directly contacts the bottom surface 62 when the panel 56 is in the deployed position, in this example. The sill 86 and top edge 88 lie in a common plane, in this example. The common plane is vertically below the panel 56, and either contains the floor 36 or is slightly below the floor 36 such that the sill 86 and top edge 88 do not impede movement of the panel 56. While the panel 56 is supported by the top edge 88 of the second panel 32, the panel 56 could be supported by another portion of the second panel 32. Alternatively, the panel 56 may only be supported by the sill 86. Further, the panel 56 could be supported in another manner.

In one example, the panel 56 is manually slidable by a user applying force to the panel 56 via the handle 70. In another example, the panel 56 is slidable between the retracted and deployed positions by a slide assembly X incorporated into the housing 58, in this example. The slide assembly X is shown schematically and includes one or more powered actuators, gears, and/or linkages configured to slide the panel 56 between the retracted and deployed positions automatically and without requiring a user to apply force to move the panel 56.

In an example, the housing 58 is a housing of a cartridge 90. The entire cartridge 90 can be removed from the front trunk 26 when the panel 56 is in the retracted position, in an example. In this manner, the panel 56 can be stored in another location to provide additional room in the front trunk 26. The front trunk 26 and/or cartridge 90 may include recesses, slots, tabs, fasteners, or other mechanical features configured to selectively hold the cartridge 90 in place relative to the front trunk 26.

In an example, when the cartridge 90 is in the front trunk 26, the bottom surface 74 of the housing 58 directly contacts the floor 36. In that example, the top surface 72 of the housing 58 provides a surface for supporting items stored in the front trunk 26. In this manner, the top surface 72 may be considered a false floor or effective floor of the front trunk 26. The housing 58 is designed to support items of varying weights placed on the top surface 72.

The cartridge 90 may also include one or more electrical connectors configured to connect the slide assembly X (if present) to power sources and the controller C (FIG. 1) of the vehicle 10. To remove the cartridge 90, any mechanical and electrical connections are first detached. In other examples, the cartridge 90 is not removable from the front trunk 26, and is instead integrally formed with one or more of the surfaces of the front trunk 26, such as the floor 36, for example.

The closure assembly 28 is moveable between the closed and open positions by a powered assembly P (FIG. 1) in this example. The powered assembly P can include one or more powered actuators, gears, and/or linkages configured to move the closure assembly 28 between the closed and open positions automatically and without requiring a user to apply force to move the closure assembly 28. The slide assembly X, which itself is a powered assembly, can be considered a subassembly of the powered assembly P.

Further, the vehicle 10 includes a controller C (FIG. 1) that can be part of an overall vehicle control module, such as a vehicle system controller (VSC), or could alternatively be a stand-alone controller separate from the VSC. The controller C may be programmed with executable instructions for interfacing with and operating the various components of the vehicle 10. The controller additionally includes a processing unit and non-transitory memory for executing the various control strategies and modes of the vehicle 10. The controller C can issue commands to the powered assembly P and the slide assembly X, which are responsive of those commands to initiate corresponding movements of the closure assembly 28 and panel 56, as examples.

In an example, when the closure assembly 28 is closed (FIG. 1) and the panel 56 is in the retracted position, in response to a command from the user, for example, the controller C is configured to command the powered assembly P to move the closure assembly 28 to the open position while simultaneously issuing a command causing the slide assembly X to move the panel 56 to the deployed position. In this way, as the closure assembly 28 opens, the panel 56 gradually slides out of the housing 58 to the deployed position. The controller C is also configured to issue commands causing the closure assembly 28 to move the closed position simultaneous with movement of the panel 56 to the retracted position. While simultaneous movements are described, the controller C could initiate other movements, such as stepped or staggered movements, in which the closure assembly 28 and panel 56 move during different time periods.

Figure 6:
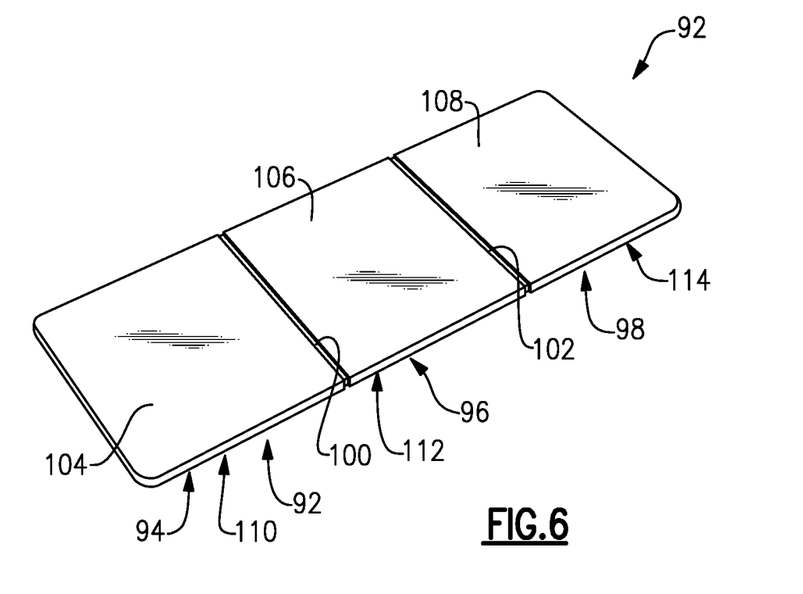
FIG. 6 is another view of the assembly in the unfolded condition.
Figure 7:
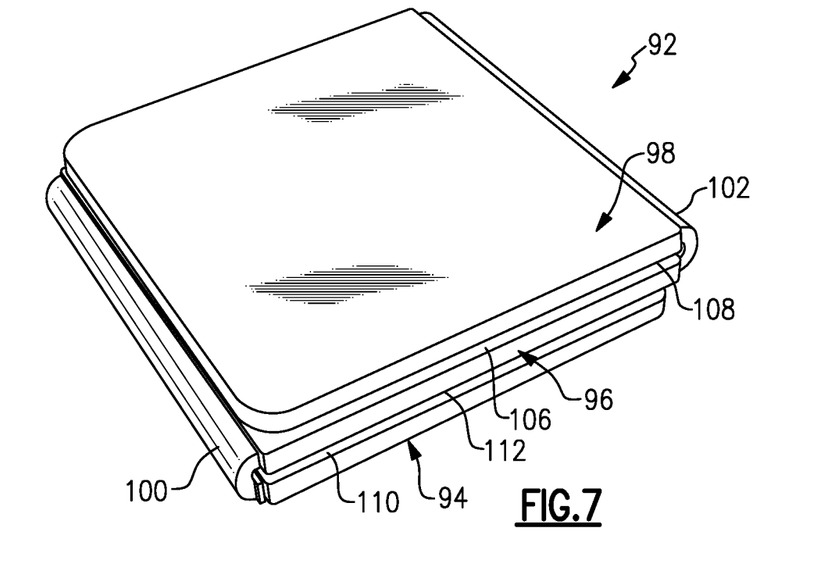
FIG. 7 illustrates the assembly in a folded condition.
Figure 8:
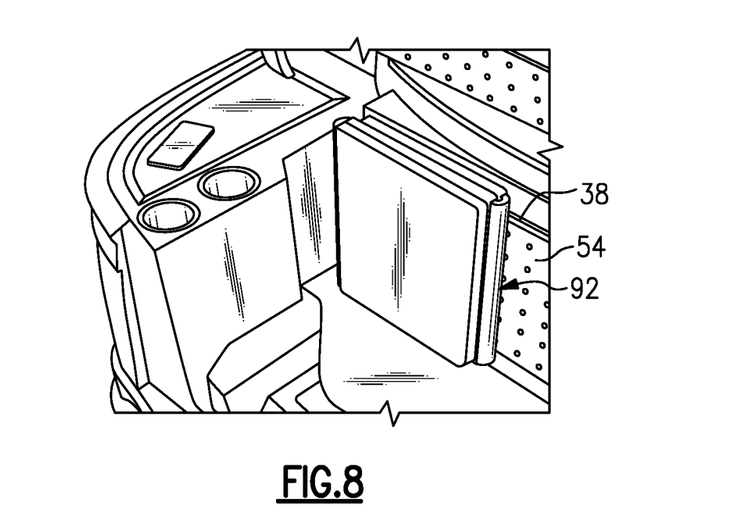
FIG. 8 illustrates the assembly of FIG. 5 in the folded condition and stowed relative to a rear wall of the front trunk.

Another exemplary work surface for the front trunk 26 is shown relative to FIGS. 5-8. In this example, the work surface is provided by an assembly 92 of at least two panels, which are configurable between an unfolded condition (FIGS. 5 and 6) and a folded condition (FIGS. 7 and 8). When the assembly 92 is in the unfolded condition, the effective surface area is increased relative to the folded condition. In this example, the assembly 92 includes three panels 94, 96, 98.

As shown in FIG. 6, the panel 96 is attached to panel 94 at one side and panel 98 at an opposite side. The panels 94, 96 are connected by a first hinge 100, and panels 96, 98 are connected by a second hinge 102, in this example. In the unfolded condition of FIG. 6, top surfaces 104, 106, 108 of the panels 94, 96, 98 provide a work surface. Bottom surfaces 110, 112, 114 of the panels 94, 96, 98 are configured to interface with the sill 86 in one example. In a particular example, the bottom surfaces 110, 112, 114 include grooves or recesses (shown in phantom in FIG. 5) configured to receive the sill 86. In another example, the bottom surfaces 110, 112, 114 include fasteners configured to fit relative to the sill 86, such as snap-fit connectors, as examples. Interfacing with the sill 86 increases the stability of the work surface. The terms "top" and "bottom" refer to the orientation of the assembly 92 in FIG. 6.

FIG. 7 illustrates the assembly 92 in the folded condition. In an example, to move the assembly 92 to the folded condition, the panel 94 is rotatable about hinge 100 such that the bottom surface 110 of panel 94 is adjacent to, and in an example contacts, the bottom surface 112 of panel 96. In that example, panel 98 is rotated about hinge 102 such that the top surface 108 of panel 98 is adjacent to, and in an example contacts, top surface 106 of panel 96.

In the folded condition, the assembly 92 is readily stored in the front trunk 26 without taking up significant space. In one example, the assembly 92 is attachable to the perforated hardboard 54 of the rear wall 38, as shown in FIG. 8. In that example, one or more fasteners, which are configured to fit relative to the perforated hardboard 54, connect the assembly 92 to the rear wall 38. In a further example, one or more of the panels 94, 96, 98 may include projections configured to fit into the holes of the perforated hardboard 54 to facilitate attachment to the perforated hardboard 54.

While the assembly 92 includes three panels in this example, the assembly 92 could include two or more panels. Further, the assembly 92 can be used in a partially unfolded condition in which only some of the panels are unfolded, depending on a desired work surface size. In this respect, the assembly 92 can be considered in a fully unfolded condition in FIGS. 5 and 6. The assembly 92 could be used in one or more partially unfolded conditions.

It should be understood that terms such as "about," "substantially," and "generally" are not intended to be boundaryless terms, and should be interpreted consistent with the way one skilled in the art would interpret those terms. Further, directional terms such as "forward," "rearward," "upward," "downward," "vertical," "horizontal," etc., are used with reference to the normal operational orientation of the vehicle and are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:
1. A motor vehicle, comprising:
a front trunk;
a housing adjacent a floor of the front trunk; and
a panel moveable relative to the housing between a retracted position and a deployed position, wherein, when in the panel is in the deployed position, the panel provides a work surface, wherein, when the panel is in the deployed position, the panel projects at least partially forward of the front trunk and the panel is supported from below by a sill of the motor vehicle, wherein the housing includes a slot in a front of the housing, wherein the slot leads to an interior of the housing, and wherein, when the panel is in the deployed position, the panel projects at least partially out of the slot.

2. The motor vehicle as recited in claim 1, further comprising a closure assembly including a hood panel and a grille panel, wherein the grille panel is configured to move to an open position in which the grille panel is below the panel.

3. The motor vehicle as recited in claim 2, wherein the hood panel and grille panel are moveable independent of one another to respective open and closed positions.

4. The motor vehicle as recited in claim 1, wherein the housing is a housing of a cartridge, and wherein the cartridge is removable from the front trunk.

5. A motor vehicle, comprising:
a front trunk;
a housing adjacent a floor of the front trunk; and
a panel moveable relative to the housing between a retracted position and a deployed position, wherein, when in the panel is in the deployed position, the panel provides a work surface, wherein, when the panel is in the deployed position, the panel projects at least partially forward of the front trunk and the panel is supported from below by a sill of the motor vehicle, wherein a bottom surface of the housing directly contacts a floor of the front trunk and a top surface of the housing provides a surface for supporting items stored in the front trunk.

6. The motor vehicle as recited in claim 1, wherein a front surface of the panel includes a handle.

7. A motor vehicle, comprising:
a front trunk; and
an assembly including at least two panels moveable relative to one another between an unfolded condition and a folded condition, wherein, in the unfolded condition, the at least two panels provide a work surface, wherein the at least two panels includes a first panel connected to a first side of a second panel via a first hinge, and a third panel connected to a second side of the second panel opposite the first side via a second hinge, wherein, in the folded condition, the first, second, and third panels are substantially parallel to one another, wherein a surface of each of the first, second, and third panels includes a groove configured such that, when in the unfolded condition, the grooves are able to interface with a sill of the motor vehicle.

8. The motor vehicle as recited in claim 7, wherein, in the unfolded condition, the assembly exhibits an increased an effective surface area relative to the folded condition.

9. The motor vehicle as recited in claim 7, wherein the assembly is configured to attach to a rear wall of the front trunk when the assembly is in the folded condition and, when the assembly is attached to the rear wall of the front trunk, the first, second, and third panels are substantially parallel to the rear wall.

10. The motor vehicle as recited in claim 9, wherein the rear wall includes perforated hardboard, and wherein the assembly is attachable to the perforated hardboard.

11. The motor vehicle as recited in claim 1, wherein a top edge of the sill directly contacts a bottom surface of the panel when the panel is in the deployed position.

12. The motor vehicle as recited in claim 2, wherein, when the grille is in the open position, a top edge of the sill and a top edge of the grill lie in a common plane.

13. The motor vehicle as recited in claim 12, wherein the common plane is below a plane containing a bottom surface of the panel.

14. The motor vehicle as recited in claim 7, wherein, in the folded condition, the first panel contacts a first surface of the second panel and the third panel contacts a second surface of the second panel opposite the first surface of the second panel.

15. The motor vehicle as recited in claim 1, wherein the sill is a portion of a body of the motor vehicle extending perpendicular to a centerline of the motor vehicle and arranged adjacent both a bottom of the front trunk and a front edge of the front trunk.

16. The motor vehicle as recited in claim 3, wherein the grille panel moves downward toward a ground surface when moving from the closed position to the open position.

* * * * *